(12) United States Patent
Spaziani et al.

(10) Patent No.: US 6,889,578 B2
(45) Date of Patent: May 10, 2005

(54) ELECTRO-MECHANICAL ACTUATOR

(75) Inventors: Phillip Spaziani, Boston, MA (US); John Murray, Boston, MA (US); Irving Laskin, Boston, MA (US); Macram Bishai, Boston, MA (US); Eric Beishline, Boston, MA (US); John Holloway, Boston, MA (US); Bill Farmer, Boston, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 09/765,899

(22) Filed: Jan. 18, 2001

(65) Prior Publication Data

US 2001/0027146 A1 Oct. 4, 2001

Related U.S. Application Data

(60) Provisional application No. 60/176,847, filed on Jan. 19, 2000, and provisional application No. 60/178,593, filed on Jan. 28, 2000.

(51) Int. Cl.[7] ............................................. F16H 37/06
(52) U.S. Cl. ............................. 74/661; 74/425; 318/15
(58) Field of Search ....................... 74/661, 425; 318/15

(56) References Cited

U.S. PATENT DOCUMENTS

| 657,244 A | 9/1900 | Liggett |
| 2,336,530 A | 12/1943 | Chandler et al. ............ 268/124 |
| 2,812,044 A | 8/1957 | Cole, Jr. ......................... 192/8 |
| 3,585,517 A | 6/1971 | McCafferty, Jr. ............... 64/30 |
| 3,616,883 A | 11/1971 | Sindelar ....................... 192/56 |
| 3,802,222 A | 4/1974 | Weber ............................ 64/30 |
| 3,834,252 A | 9/1974 | Abell et al. ..................... 81/52 |
| 3,934,688 A | 1/1976 | Sides et al. ................... 192/48 |
| 3,937,036 A | 2/1976 | Sauerwein ..................... 64/29 |
| 4,026,163 A | 5/1977 | Merkert ....................... 74/425 |

(Continued)

Primary Examiner—Matthew C. Graham
(74) Attorney, Agent, or Firm—Grossman, Tucker, Perreault & Pfleger, PLLC

(57) ABSTRACT

An electro-mechanical actuator including a plurality of motors for driving an output shaft. The actuator may be incorporated into a window lift mechanism, such as a mechanism including a dual rack and pinion assembly. According to another aspect of the invention there is provided a variety of anti-back-drive mechanisms, e.g. clutches. A clutch according to one embodiment includes locking pawls that resist back-drive. In another embodiment, locking cams rotate relative to a carrier to resist back-drive. An actuator consistent with the invention may incorporate an impact mechanism including a flexible carrier. The carrier flexes to prevent impact forces at an output gear train from coupling to an input gear train.

6 Claims, 18 Drawing Sheets

U.S. PATENT DOCUMENTS

| | | | |
|---|---|---|---|
| 4,159,050 A | 6/1979 | Hopkins, Sr. et al. | 192/34 |
| 4,161,242 A | 7/1979 | Moores, Jr. et al. | 192/34 |
| 4,215,592 A | 8/1980 | Calvert | 74/661 |
| 4,367,660 A | 1/1983 | Becker et al. | 74/625 |
| 4,503,370 A | 3/1985 | Cuneo | 318/331 |
| 4,608,820 A | 9/1986 | White et al. | 60/39 |
| 4,643,040 A | 2/1987 | Adam et al. | 74/425 |
| 4,698,938 A | 10/1987 | Huber | 49/138 |
| 4,710,071 A | 12/1987 | Koehler et al. | 408/133 |
| 4,757,725 A | 7/1988 | Beugin | 74/422 |
| 4,815,837 A | 3/1989 | Kikuchi et al. | 350/637 |
| 4,851,729 A | 7/1989 | Baines | 310/239 |
| 4,908,988 A | 3/1990 | Yamamura et al. | 49/358 |
| 5,024,022 A | 6/1991 | Ito | 49/139 |
| 5,027,670 A | 7/1991 | Adam | 74/425 |
| 5,095,766 A | 3/1992 | Knappe et al. | 74/89 |
| 5,184,039 A | 2/1993 | Kraft | 310/89 |
| 5,293,788 A * | 3/1994 | Blom | 74/661 |
| 5,346,045 A | 9/1994 | Bennet et al. | 192/141 |
| 5,404,060 A | 4/1995 | Nakahashi et al. | 310/83 |
| 5,410,229 A | 4/1995 | Sebastian et al. | 318/434 |
| 5,449,043 A | 9/1995 | Bourner et al. | 173/178 |
| 5,463,914 A * | 11/1995 | Tyan | 74/661 |
| 5,480,198 A * | 1/1996 | Wydler et al. | 242/144 |
| 5,488,880 A | 2/1996 | Sartorio | 74/424.8 B |
| 5,531,498 A | 7/1996 | Kowall | 296/146 |
| 5,538,089 A | 7/1996 | Sanford | 173/2 |
| 5,628,374 A | 5/1997 | Dibbern, Jr. | 173/48 |
| 5,704,433 A | 1/1998 | Bourner et al. | 173/48 |
| 5,738,177 A | 4/1998 | Schell et al. | 173/178 |
| 5,787,644 A | 8/1998 | Thomsen, Jr. | 49/351 |
| 5,801,501 A | 9/1998 | Redelberger | 318/283 |
| 5,806,244 A | 9/1998 | Tilli | 49/358 |
| 5,834,662 A | 11/1998 | Stoll et al. | |
| 5,836,205 A | 11/1998 | Meyer | 74/89.17 |
| 5,946,859 A | 9/1999 | Kramer et al. | 49/362 |
| 6,026,611 A | 2/2000 | Ralston et al. | 49/123 |
| 6,041,549 A | 3/2000 | Schust et al. | 49/375 |
| 6,043,616 A | 3/2000 | Redelberger | 318/9 |
| 6,208,101 B1 | 3/2001 | Seeberger et al. | 318/466 |

* cited by examiner

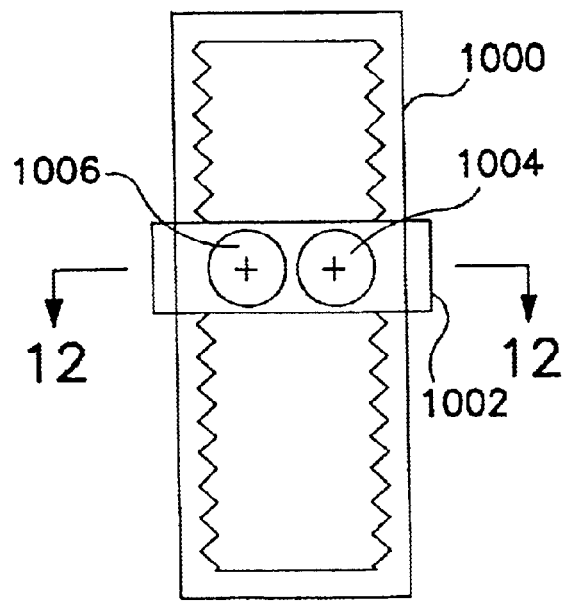
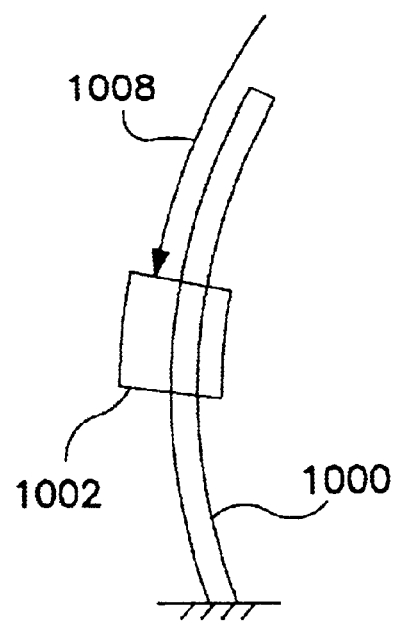
FIG. 10
FIG. 11
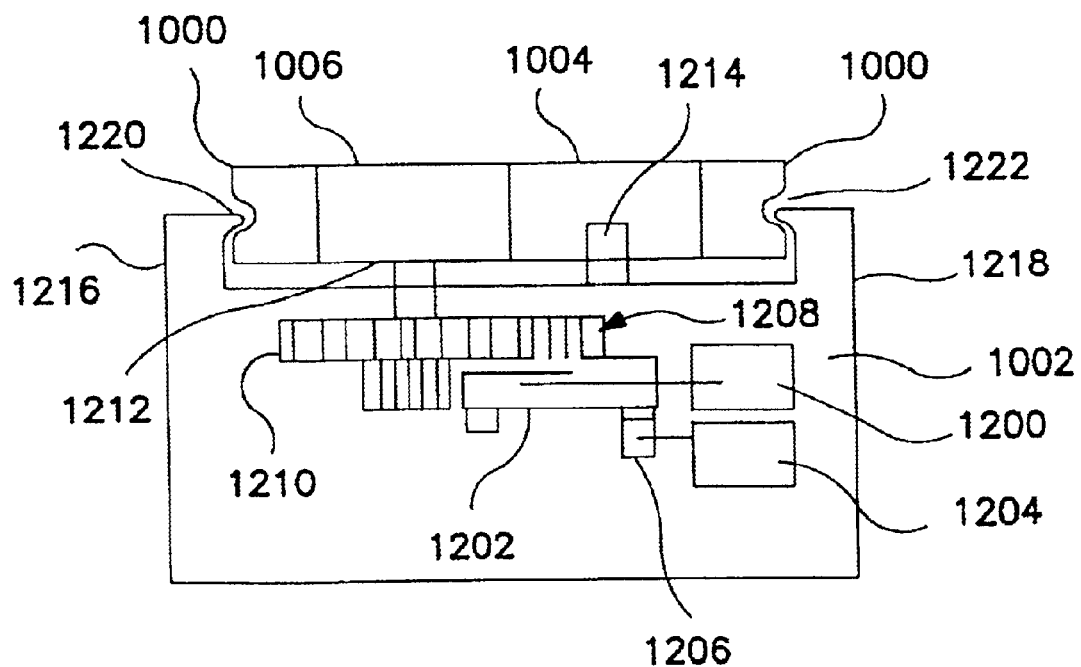
FIG. 12

ELECTRO-MECHANICAL ACTUATOR

CROSS-REFERENCE TO RELATED APPLICATIONS

The present application claims the benefit of the filing dates of U.S. Provisional Application Nos. 60/176,847 and 60/178,593 filed Jan. 19, 2000 and Jan. 28, 2000, respectively, the teachings of which are incorporated herein by reference.

FIELD OF THE INVENTION

The present invention relates generally to an electro-mechanical actuator, and, in a particular embodiment, to an actuator for raising and lowering a window such as an automobile window.

BACKGROUND OF THE INVENTION

Electro-mechanical actuators are commonly used for a wide variety of applications. In an automotive setting, for example, actuators may be used for raising and lowering windows, for opening and closing sunroofs, controlling windshield wipers, etc. In a power window application, for example, an actuator may be located in each door assembly having an operable window, and usually includes an electric motor of some sort and a drive mechanism for raising and lowering the window, or in the case of the sunroof, for example, for opening and closing, or otherwise moving the sunroof.

Power windows, sunroofs, etc. are conventionally driven by a single motor, which may be gear driven or of a worm gear configuration, connected to a mechanism for raising and lowering the window, operated by means of a switch control. Such an actuator is disclosed, for example, in U.S. Pat. No. 5,801,501, wherein a single motor drives a worm gear drivably connected to mechanism for lifting the window or moving the sunroof. This configuration transmits all torque from a single motor. The higher friction and lower efficiency worm drive results in lower overall system efficiency, and greater electrical power requirements to achieve sufficient power output.

Such single motors are often larger in size than may be desirable from an overall design standpoint and may require a comparatively large amount of electric current in order to function smoothly, efficiently, and responsively. U.S. Pat. No. 5,787,644, for example, discloses a power window system with the drive motor located within the body rather than within the door of the vehicle due to the size of the motor. Although this alleviates, in part, the design concerns, the problems associated with engine size and power requirements remain.

Utilizing a smaller motor, however, sacrifices motor power, speed and efficiency. Moreover, if the motor fails, the window, sunroof, wiper, etc., as the case may be, is rendered inoperable, whether in open or closed position. Not only are such failures common, they occur without any prior notice. U.S. Pat. No. 5,024,022 addressed these issues by providing an automobile window opening and closing device which has a manually operated mechanism and a power-operated mechanism in combination. This configuration, however, represents a step backwards from the full power window or sunroof features desired in today's automobiles.

An application that uses two motors is found in a device for automatically adjusting a rearview mirror, U.S. Pat. No. 4,815,837. There, each electric motor operates a separate drive mechanism for performing a distinct adjustment of the angles of the mirror. U.S. Pat. No. 5,346,045 discloses an electrically powered linear actuator for supporting and moving the cabin of a fight simulator, including two large motors capable of moving and supporting the substantial weight of the simulator, each having a pinion engaging a chain or gear train coupling, which drives a pulley secured to the end of a screw threaded drive shaft driving a traveling member.

There is therefore a need in the art for an efficient and cost-effective actuator to design that overcomes the deficiencies of the prior art.

SUMMARY OF THE INVENTION

According to one aspect of the invention there is provided an actuator including: an output shaft for driving a window lift mechanism; an output gear coupled to the output shaft; and a plurality of motors coupled to the output gear for driving the output gear and the output shaft. A window lift mechanism according to another aspect of the invention includes: a dual rack assembly having first and second opposed racks; first and second pinions in meshing engagement with the first and second racks, respectively; and an actuator assembly comprising a plurality of motors for driving the first and second pinions along the first and second racks.

According to another aspect of the invention there is provided a variety of clutches for preventing back-drive in an actuator. One clutch according to the invention includes an output gear and an input gear concentric with the output gear. The output gear has at least one notch at a perimeter thereof for receiving an associated tab on interior surface of the input gear. The interior surface of the input gear further includes a locking pawl notch. The clutch further includes first and second locking pawls. The locking pawls are joined by a spring and disposed at opposite ends of the locking pawl notch adjacent the perimeter of the output gear. Upon rotation of the input gear, the tab engages the at least one notch to rotate the output gear in a first direction. Upon rotation of the output gear in a second direction opposite to the first direction, the locking pawls engage the output gear to resist rotation of the output gear.

Another clutch consistent with the invention includes: a carrier disposed on an output shaft; and a plurality of cams. Each of the cams is pivotally coupled to the carrier and has an end positioned adjacent a cam engaging surface. Upon application of a rotational force to the output shaft in a first direction, the cams pivot relative to the carrier to allow rotation of the output shaft. Upon application of a rotational force to the output shaft in a back-drive direction, the cams pivot relative to the carrier to engage the cam-engaging surface to resist rotation of the output shaft.

According to another aspect of the invention there is provided an actuator including an impact mechanism. The actuator includes: a flexible carrier assembly; a gear train coupled to the flexible carrier assembly, the gear train including a worm gear coupled to a worm wheel; an input gear train including a first spur gear in meshing engagement with the worm wheel; an output gear train including a second spur gear in meshing engagement with the worm gear; and at least one motor for driving the input gear train. Upon application of a linear force to an output gear of the output gear train, the flexible carrier assembly flexes to substantially prevent the linear force from coupling to the input gear train.

BRIEF DESCRIPTION OF THE DRAWINGS

For a better understanding of the present invention, together with other objects, features and advantages, reference should be made to the following detailed description which should be read in conjunction with the following figures wherein like numerals represent like parts:

FIG. 10 illustrates an exemplary actuator consistent with the invention mounted for driving a window in a dual rack system;

FIG. 11 diagrammatically illustrates a side view of the arrangement illustrated in FIG. 10;

FIG. 12 illustrates a sectional view taken along lines 12—12 in FIG. 10;

DETAILED DESCRIPTION

Figure 1:
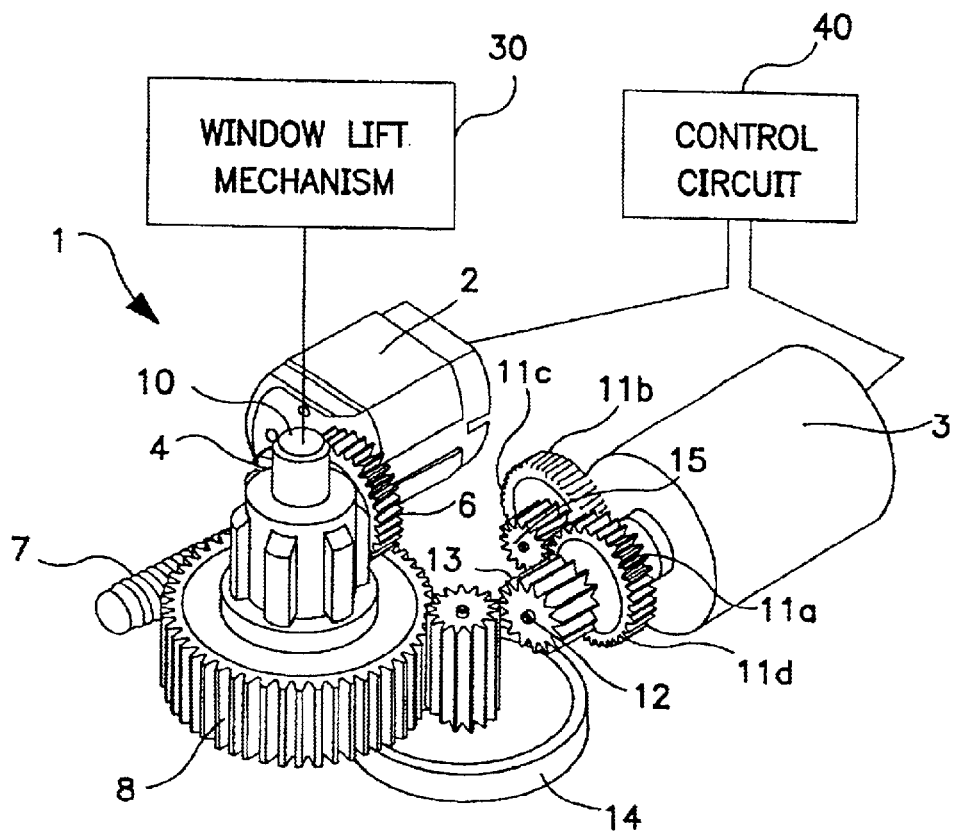
FIG. 1 is a perspective view an exemplary actuator powered by two motors and gear trains coupled to a drive gear consistent with the present invention.
Figure 2:
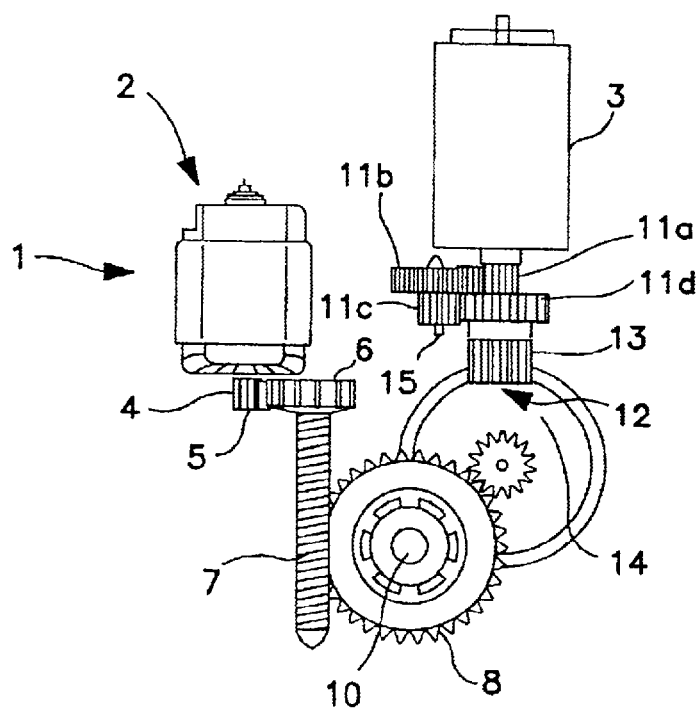
FIG. 2 is a plan view of the exemplary actuator illustrated in FIG. 1.
Figure 3:
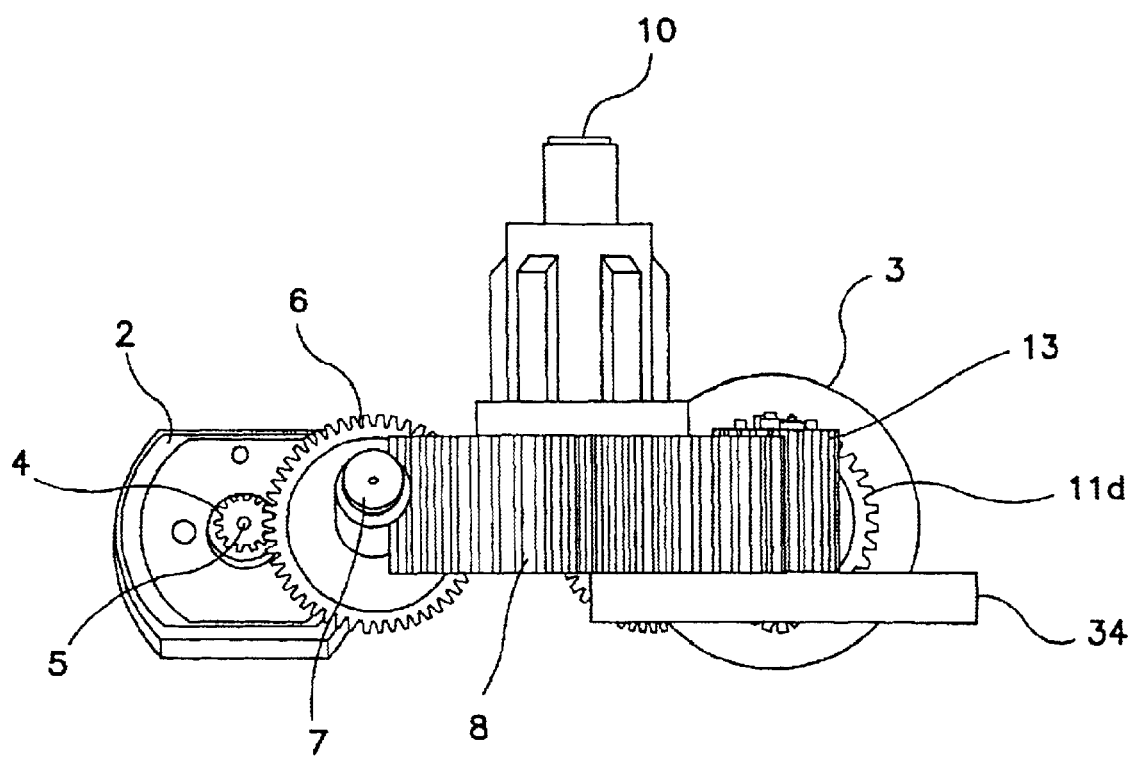
FIG. 3 is a front view of the exemplary actuator illustrated in FIG. 1.
Figure 4:
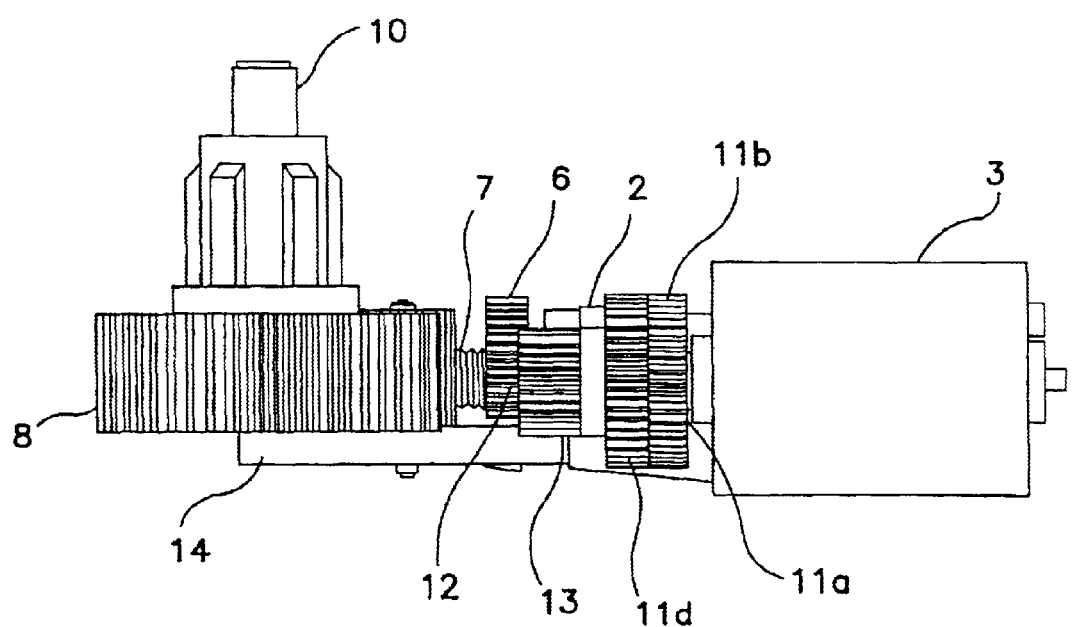
FIG. 4 is a side view of the exemplary actuator illustrated in FIG. 1.

Referring to FIGS. 1 through 4, an exemplary actuator 1 consistent with the invention is illustrated. As shown, the actuator 1 includes two electric motors 2 and 3. A control circuit 40 controls energization of the motors. The control circuit may include, for example, a simple switch, or more complex arrangement providing pinch resistance, express open/close, etc.

Motor 2 has a first drive pinion 4 disposed about its output shaft 5 which engages worm wheel 6 attached to worm gear 7. The worm gear 7 engages spur gear 8 for driving an actuator output shaft 10. The output shaft is provided in driving relationship to a mechanism to be driven, e.g. a window lift mechanism 30. The window lift mechanism may include, for example, a conventional scissor lift, a cable and pulley mechanism, etc. The present invention is not, however, limited to window lift applications. In fact, an actuator consistent with the invention may be provided to drive a wide variety of mechanisms for achieving the attendant advantages.

Motor 3 drives a gear train including individual gears 11a–d. Pinion gear 11a is disposed about the motor shaft 12, the end portion of which also serves to align high efficiency gear 11d and drive gear 13 attached to high efficiency gear 11d. The drive gear 13 engages a second high efficiency gear face gear 14, which drivably engages output spur gear 8 for driving the output shaft 10. Gears 11b and 11c are secured by gear shaft 15.

When both the electric motors 2 and 3 are energized, worm gear 7 and high efficiency gear 14 both independently drive spur gear 8 and shaft 10 causing the window, sunroof, etc. to be opened or closed. Since the two motors 2 and 3 do not share the same gear trains, they can be controlled on different circuits and may produce variable speed and torque rotary output or other power distribution arrangements. For example, the motors may be configured so that the inherent torque ripple of the motors is out of phase with one another. This may reduce or cancel actuator vibration and hum inherent in a single motor. There is an inherent resolution of output rotational speed proportional with the number of motors and gear train sets. Meaningful variations can be achieved by combining multiple motors on either parallel drive trains or connecting the motors in series, along with any combination of clutch devices.

In addition, multiple motors on a common drive train provide a soft failure mode in the event that one motor fails. The remaining motors will provide basic function at a reduced performance level until service can be performed. When combined with simple electronic control circuitry numerous torque and speed outputs can be achieved without introducing advanced velocity control electronics such as Pulse Width Modulation or proportional voltage adjustment. For example, the actuator can operate on motor 2 ("A") only, motor 3 ("B") only, "AB", "A with B reversed", etc.

The application of a worm gear 7 and worm wheel 6, driven only by motor 2 in conjunction with a high-efficiency parallel drive train driven by motor 3 provides anti-back drive and passive braking/clutching features. Back drive of the output shaft 10 is inherently limited by the worm gear while preserving the higher acceleration and efficient torque transfer of the motor 3. The worm gear 7 coupled to the motor 2 thus acts like a clutch in the system 1.

If the high efficiency drive train powered by motor 3 is designed such that its output rotational speed is greater than the motor and drive train, the worm gear will inherently limit the actuator's overall output rotational speed. At speeds above this point the apparent motion of the common output begins to accelerate the worm gear train, which acts like a brake. In addition, the inherently high friction of the worm gear when "reversed" provides a high drag load to the system multiplied by the gear ratio of the worm gear consuming any additional power generated by the high efficiency drive train. This governs the system to an output speed closely approximating the no load speed of the worm gear train of the system.

Figure 5:
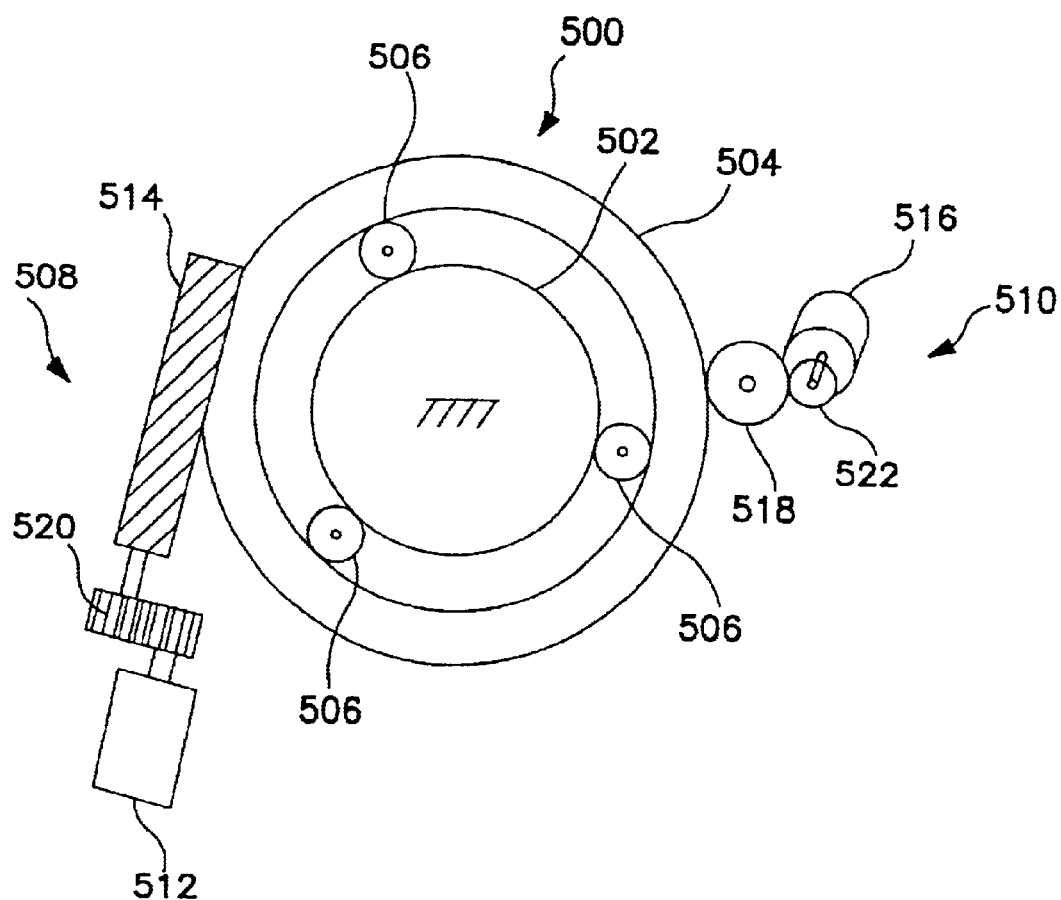
FIG. 5 illustrates another exemplary embodiment of an actuator consistent with the invention wherein a planetary gear system is driven by separate worm and spur gear arrangements.
Figure 6:
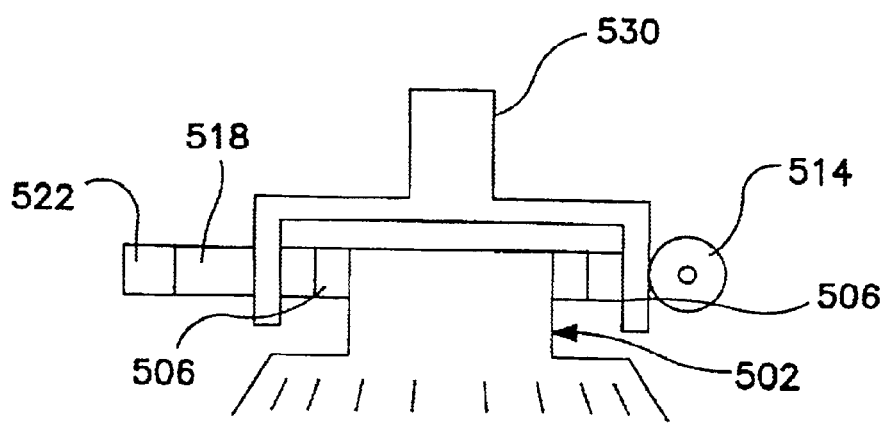
FIG. 6 is a partial sectional view of the embodiment illustrated in FIG. 5.

A variety of multiple motor configurations consistent with the invention are possible. FIGS. 5 and 6, for example, illustrate an exemplary actuator consistent with the invention wherein the output shaft is driven through a planetary gear system 500. In the illustrated embodiment, the planetary gear set includes a stationery sun gear 502. Ring gear 504 rotates around the sun gear with planet gears 506 in a manner well known to those skilled in the art. Consistent with the invention, the ring gear is driven by a worm gear drive set 508 and a spur gear drive set 510. A first motor 512 drives the worm gear 514 and a second motor 516 drives a spur gear 518, potentially through intermediate gears 520, 522, respectively. As in the embodiment illustrated in FIGS. 1–4, the worm gear inherently provides anti-back drive characteristics.

Coarse pitched teeth on the outer ring 504 are preferable for achieving appropriate efficiency and back drive characteristics. Those skilled in the art will recognize that, as an alternative to the illustrated embodiment, the output shaft 530 could be in fixed relation to rotatable sun gear with the ring gear in a fixed position.

Figure 7:
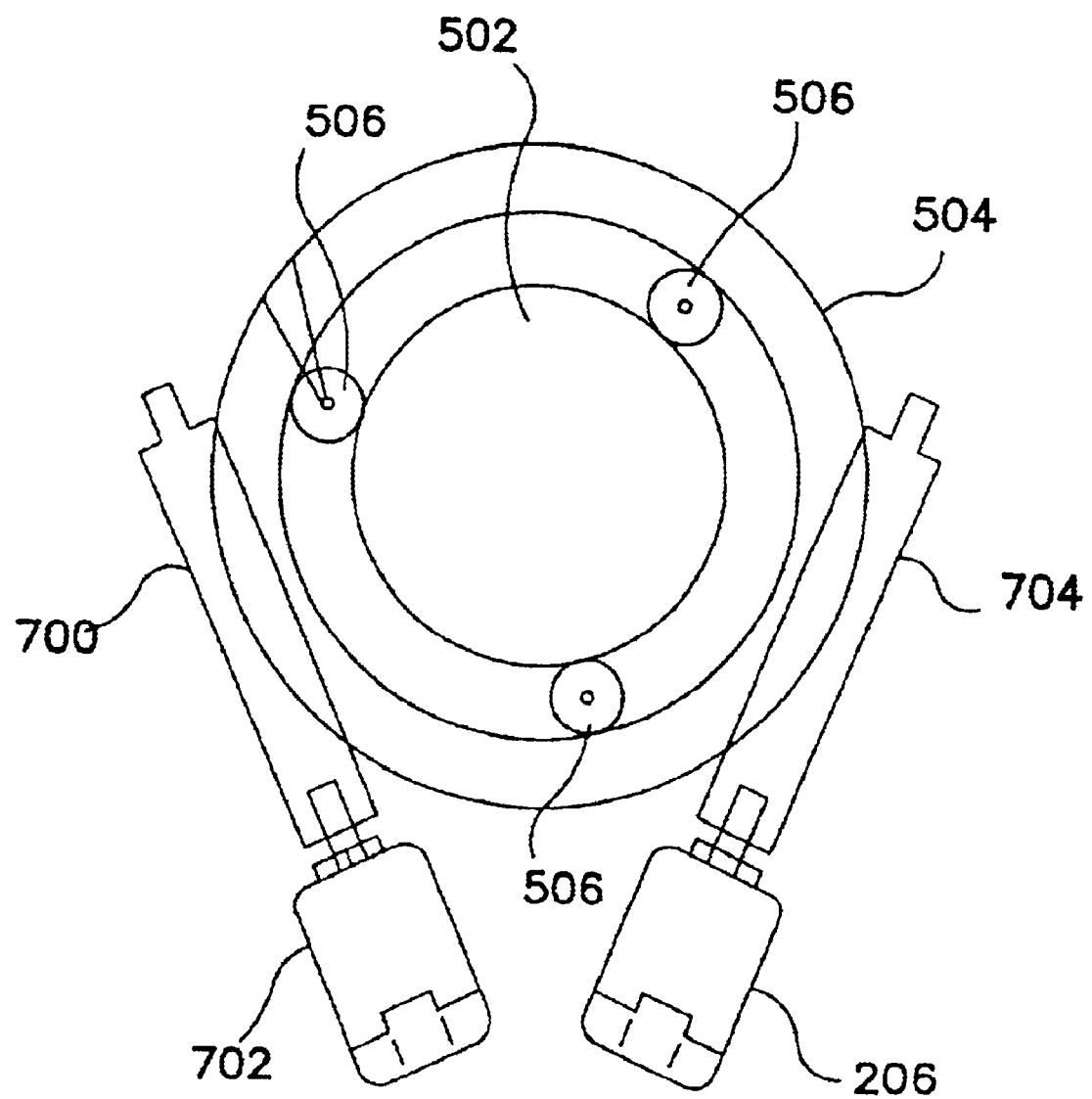
FIG. 7 illustrates another exemplary embodiment of an actuator consistent with the invention wherein a planetary gear set is driven through two separate worm gear sets.

An alternative planetary gear arrangement is illustrated in FIG. 7. The embodiment illustrated in FIG. 7 is substantially similar to that shown in FIGS. 5 and 6 with the main exception being the inclusion of two worm gear drive sets instead of a worm gear drive set and a spur gear drive set. As shown, the ring gear 504 and planetary gears 506 are driven around a fixed sun gear 502 by a first worm gear 700 driven by a first motor 702 and separately by a second worm gear 704 driven by a second motor 706. Again, it will be recognized by those skilled in the art the either the ring gear affixed to sun gear or a carrier for planetary gears may be coupled to the output shaft for driving the shaft.

Figure 8:
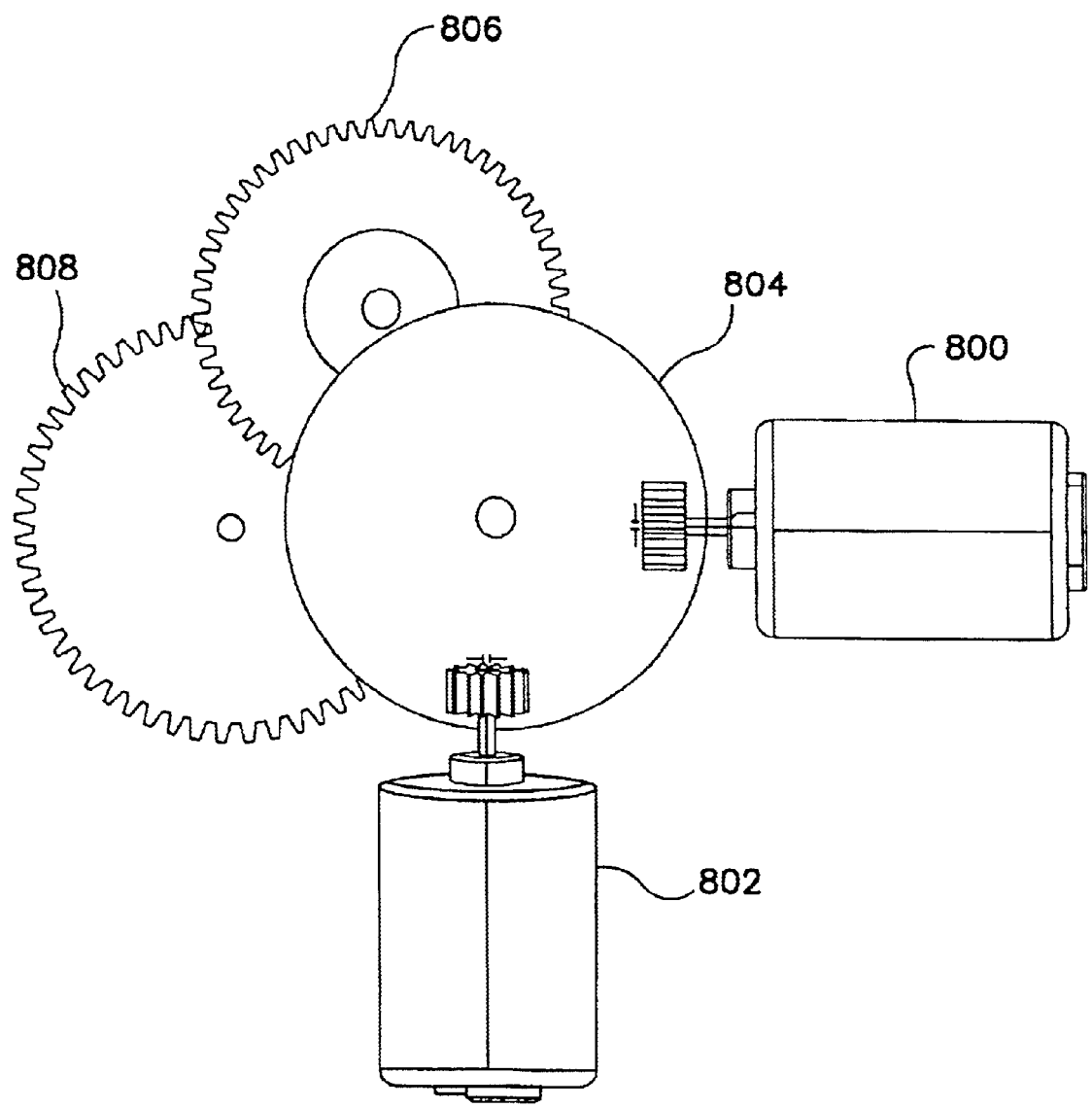
FIG. 8 illustrates another exemplary embodiment of an actuator consistent with the invention wherein multiple motors drive a single face gear.
Figure 9:
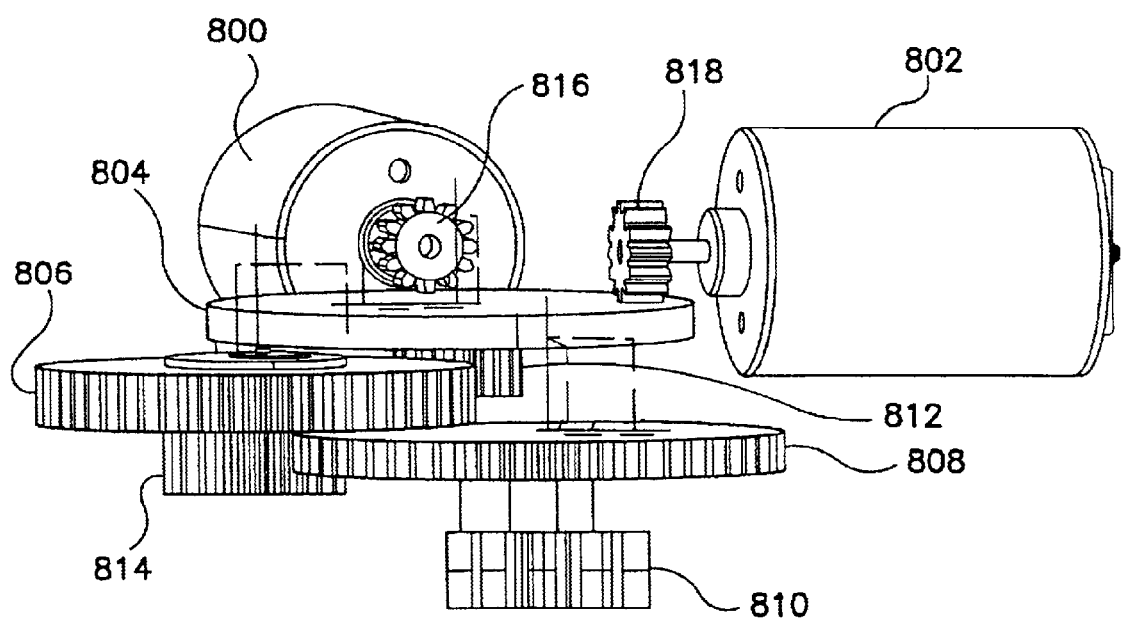
FIG. 9 is a side view of the exemplary embodiment illustrated in FIG. 8.

FIGS. 8 and 9 illustrate another alternative embodiment of an actuator consistent with the invention wherein first and second motors 800 and 802 separately drive a face gear 804, which may drive a spur gear set including gears 806 and 808 for driving an output shaft 810 connected to gear 808. As shown in FIG. 9, the face gear may be a compound gear including a pinion 812 for driving compound gear 806, which includes a pinion 814 for driving gear 808. Pinions 816 and 818 on motors 800 and 802 respectively engage the face gear for driving the same.

FIGS. 10–12 illustrate an exemplary actuator consistent with the invention configured in a dual rack arrangement for driving a window in a power window system. As shown in FIG. 10 an actuator 1002 consistent with the invention may be configured for driving first and second pinions 1004 and 1006 along opposed racks 1001, 1003 of a known dual rack 1000. As is known, the window glass 1008 (FIG. 11) may be securely coupled to the pinions or the actuator assembly, and the rack may be held stationery within a door. As the actuator drives the pinions, the pinion, actuator and glass assembly translates along the rack for opening and closing the window depending on the direction of rotation of the pinions.

As shown in cross-sectional view in FIG. 12, an exemplary actuator 1002 may include a first motor 1200 driving a worm gear 1202 and a second motor 1204 driving a spur gear set 1206 in a manner consistent with the invention, as described for example in connection with FIGS. 1–4. The worm gear and spur gear sets may drive a gear 1208, which in turn drives output gear 1210 having a driving shaft 1212 connected for driving the first pinion 1006. The first pinion may be in meshing engagement with second pinion 1004, which is rotatable on a carrier axle 1214. The actuator assembly may include first and second arms 1216 and 1218 respectively having portions that extend into grooves 1220, 1222, respectively. When the motors are energized, the actuator drives the pinions to cause translation of the actuator, pinion and glass assembly along the dual racks with the actuator sliding along the grooves 1220, 1222.

Figure 13:
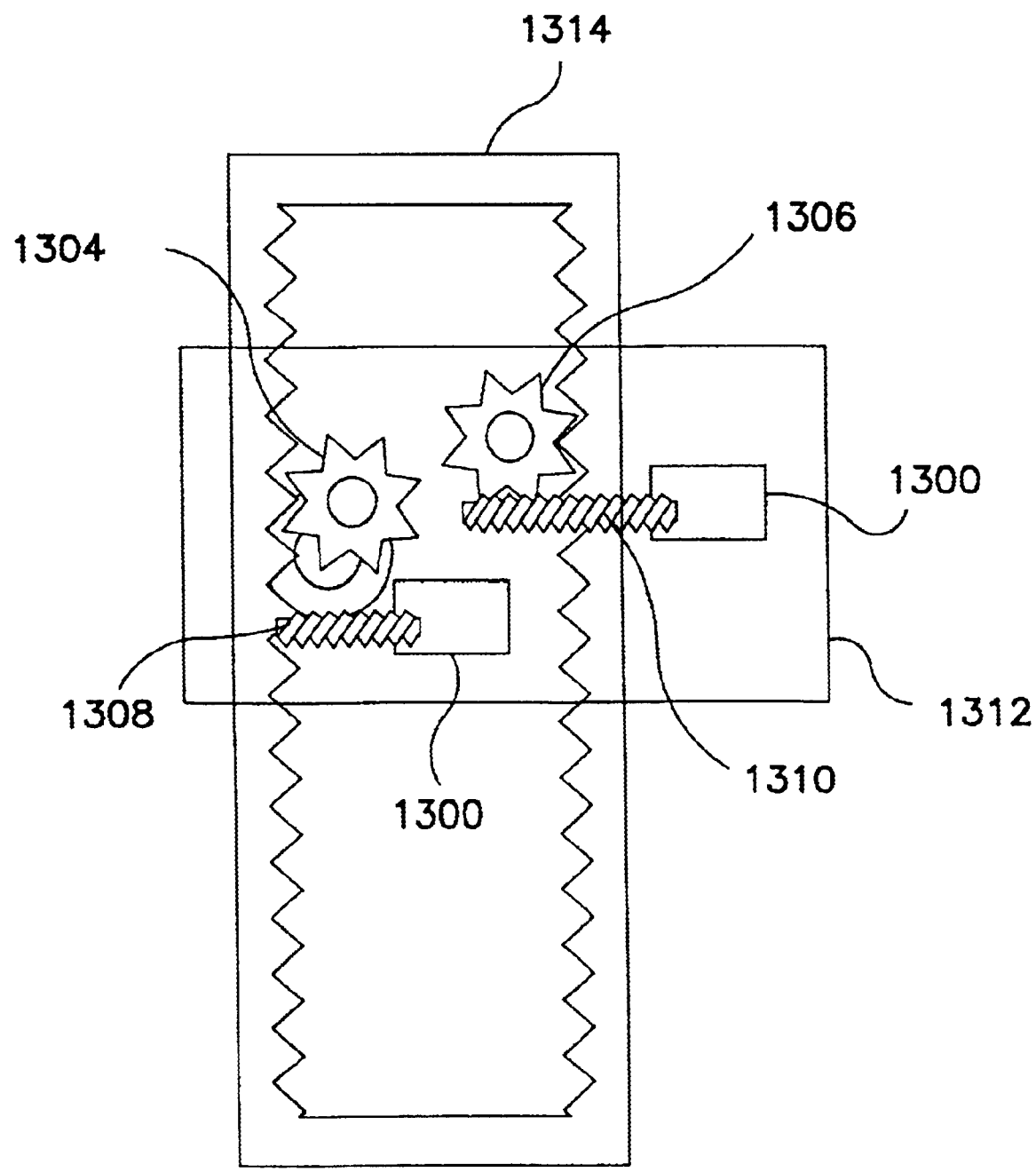
FIG. 13 illustrates an alternative actuator configuration for use in connection with a dual rack system as shown in FIG. 10.

Those skilled in the art will recognize that a variety of configurations of an actuator consistent with the invention may be incorporated into a dual rack system for an automotive window lift application. For example, FIG. 13 illustrates an alternative embodiment including two separate motors 1300 and 1302, which separately drive first and second pinions 1304 and 1306 through associated worm gear drives 1308 and 1310, respectively. Again, the actuator housing 1312 would be attached to the automotive glass so that the glass would move up and down relative to the dual racks 1314 to raise and lower the window with actuation of the motors 1300 and 1302.

Figure 14:
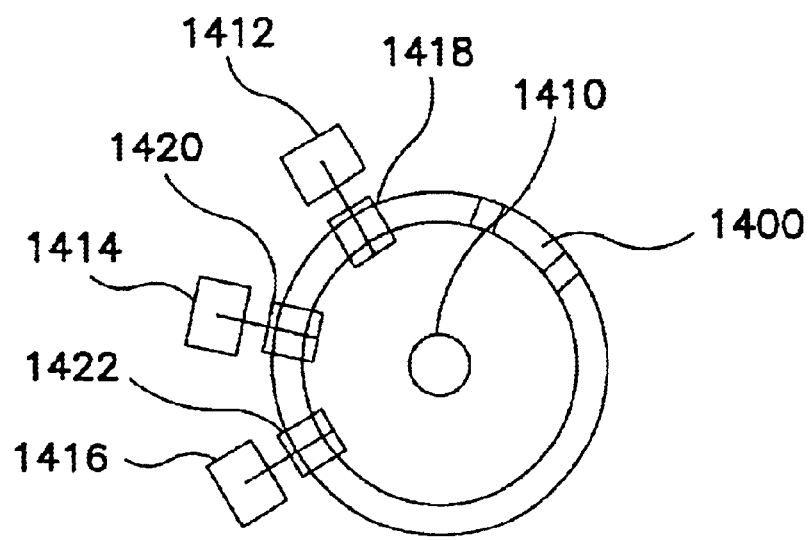
FIG. 14 diagrammatically illustrates an arrangement including three separate motors for driving an output shaft connected to a face gear.

Turning now to FIG. 14, there is illustrated a face gear 1400 with an output shaft 1410 affixed thereto for driving a mechanism consistent with the invention. As shown, the face gear is driven by first, second and third motors 1412, 1414 and 1416 through associated pinions 1418, 1420 and 1422, respectively. FIG. 14 illustrates the advantages associated with using multiple motors for driving a common output shaft. It is to be understood, however, that multiple motors could be arranged in any way to drive the common output shaft, which could be connected to a face gear, a planetary gear set, etc.

Figure 15:
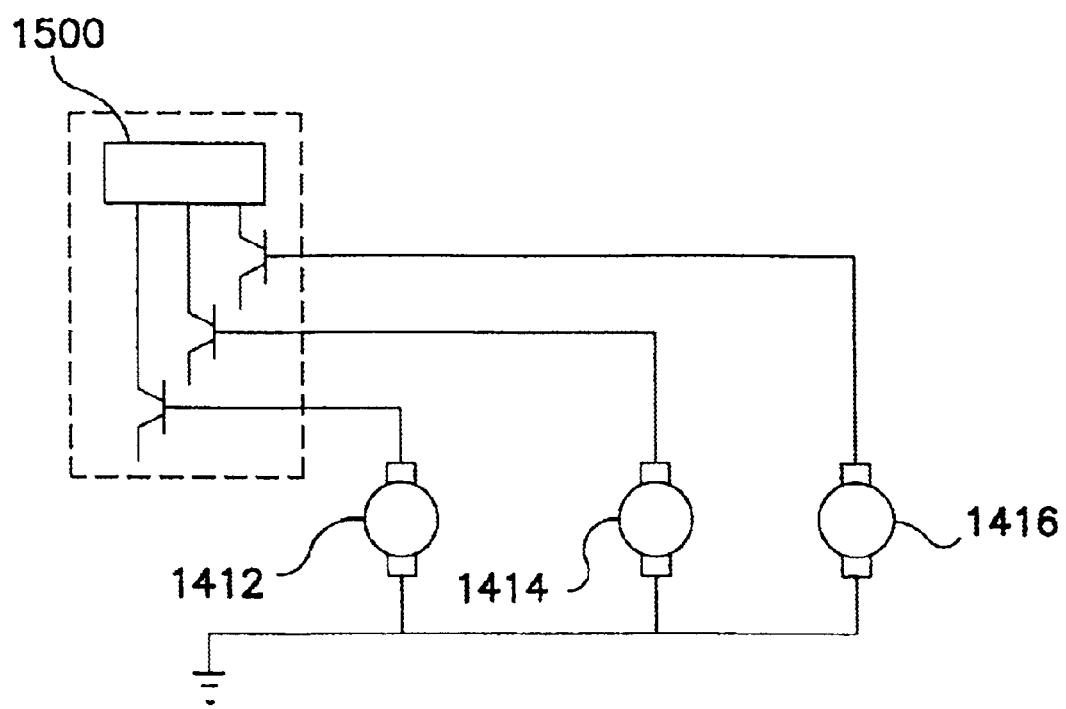
FIG. 15 is a circuit diagram illustrating electrical connections for a multiple motor assembly as shown in FIG. 14 for example.

As shown in FIG. 15, an electronic control module 1500 may be provided for selectively energizing the respective motors. Based on operator input, the electronic control module or other switch arrangement can be provided to control how many motors are energized and in which directions. Depending on the number of motors provided in an actuator consistent with the invention, the load and speed for driving the motors may vary.

For example, in a power window application an "express up" condition may be desired for moving the window to a closed position at a rapid pace. With reference to the embodiment illustrated in FIG. 14, in an "express up" a condition, the electronic control module may energize all three motors simultaneously based on an operator input to achieve the necessary torque and speed for driving a window at a high rate. In addition, a sensor or sensors may be provided to sense when the window is at a nearly closed position to reduce the driven speed of the window when it is nearly closed by, for example, de-energizing one or more of the motors. Also, the sensors may be incorporated into the assembly for identifying when an object is in the path of the window to prevent crushing of the object between the window and the window frame. When an object is present, the electronic control module may, for example, disable all the motors to provide "pinch resistance." A rain sensor could also be provided for causing energization of the actuators to close the window when it is raining.

As noted herein, a multiple motor actuator arrangement may also provide significant utility in connection with window wiper systems and sunroof. For example, the multiple motors can be configured for driving wipers at different speeds. The electronic control module 1500 may energize all motors in the system to drive the wipers at a high rate of speed, and may energize somewhat less than all of the motors to drive the wipers at a lower speed. In addition, an actuator according to the invention can be provided to allow a predetermined amount of back drive so that an electronic control module 1500 may back drive a wiper blade into an at home position after the wipers are de-energized.

Figure 16:
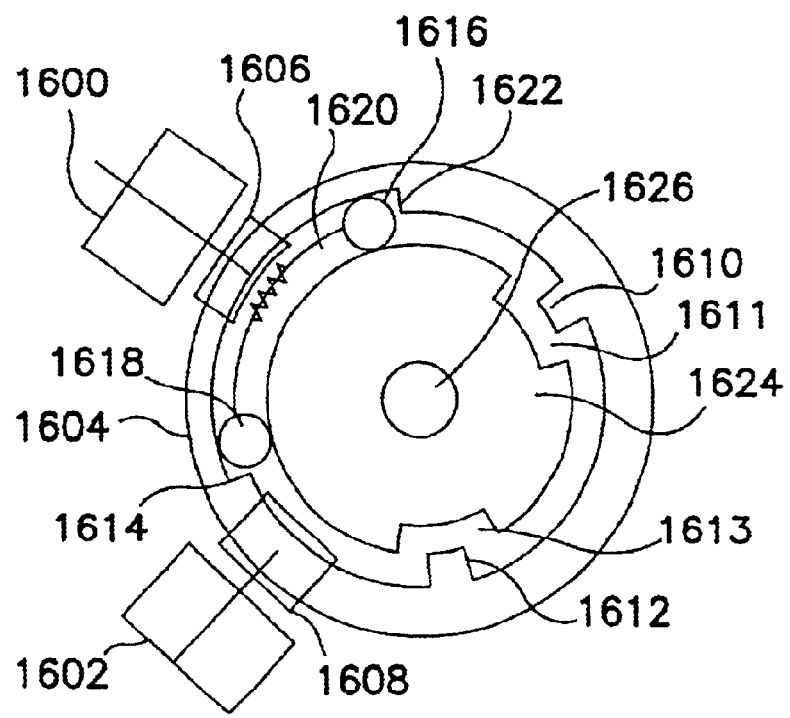
FIG. 16 illustrates an exemplary bi-directional clutch anti-back drive mechanism consistent with the invention.
Figure 17:
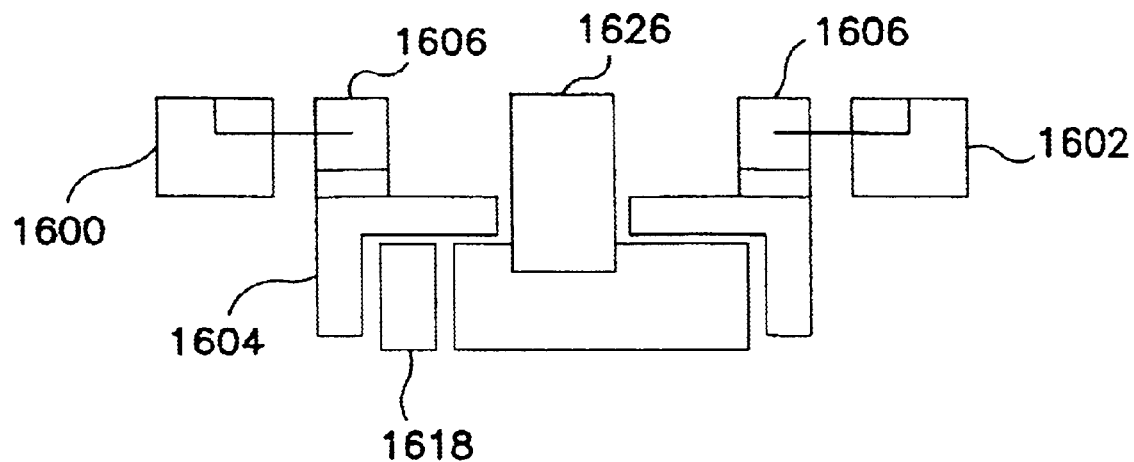
FIG. 17 is a sectional view of the mechanism illustrated in FIG. 16.

Anti-backdrive in an actuator consistent with the invention may be accomplished using a worm gear set or solenoid device, as discussed above, or other clutch-type mechanisms. FIGS. 16 and 17, illustrate an exemplary bi-directional clutch anti-back drive mechanism consistent with the invention. As shown, first and second motors 1600 and 1602 drive an input gear 1604, e.g. a face gear, through pinions 1606 and 1608. It will be understood by those skilled in the art that any gear train may be provided between the motors and the pinions 1606, 1608 for driving the face gear and that the face gear could be substituted with a spur configuration, worm gear, etc.

In the illustrated embodiment, the interior surface of the face gear includes first and second spaced tabs 1610 and 1612 and a notch 1614. Locking pawls 1616, 1618 are disposed at opposite ends of the notch 1614 and connected by a spring 1620. With rotation of the face gear by the motors, the edge 1622 of the notch engages the locking pawl 1616 causing rotation of the locking pawls with the face gear. Tabs 1610 and 1612 engage edge surfaces of notches 1611, 1613, respectively, on an output gear 1624 to which the output shaft 1626 is secured. Back drive is prevented in the illustrated mechanism since rotation of the output shaft causes engagement of the output gear with the locking pawls to prevent rotation of the output gear.

Figure 18:
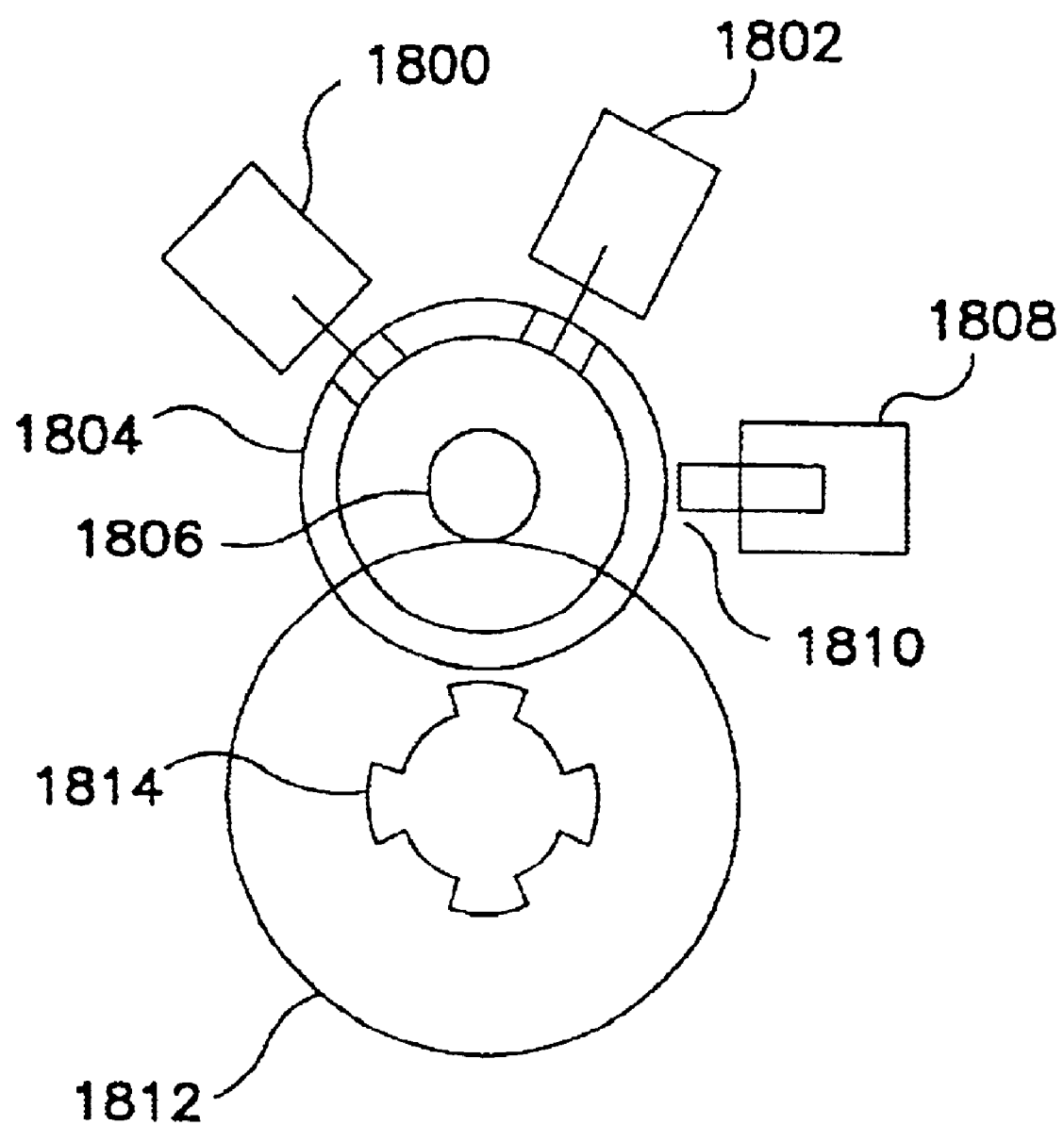
FIG. 18 diagrammatically illustrates a solenoid back drive mechanism in connection with an actuator consistent with the invention.
Figure 19:
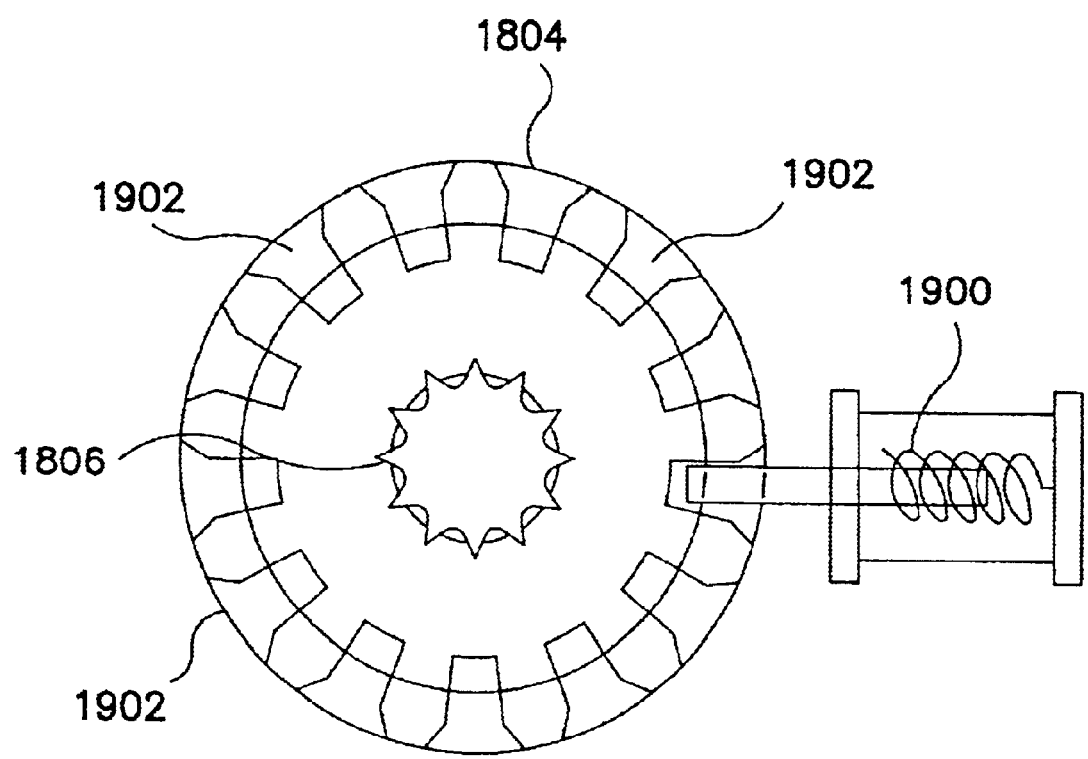
FIG. 19 illustrates a solenoid anti-back drive mechanism as shown in FIG. 18 wherein a solenoid plunger is engaged with an intermediate gear for preventing back drive.
Figure 20:
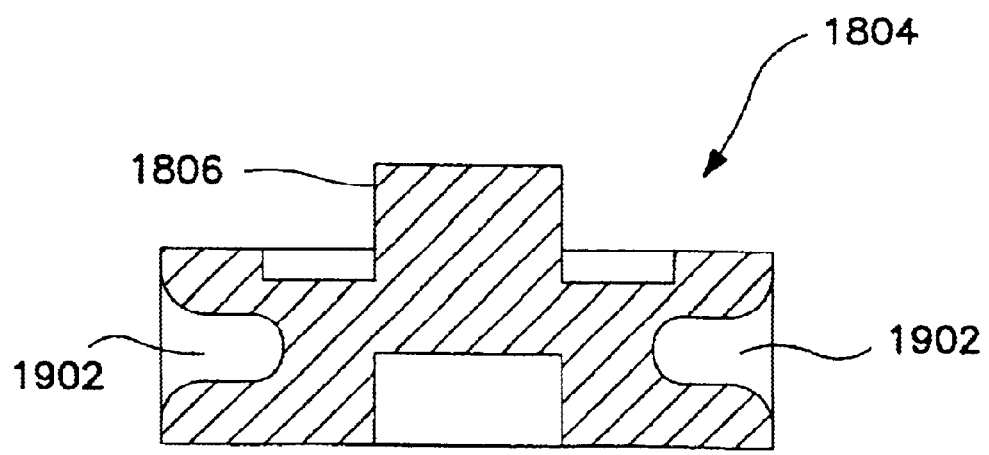
FIG. 20 illustrates an exemplary intermediate gear including pockets for receiving a solenoid plunger in a solenoid anti-back drive mechanism as shown, for example, in FIGS. 18 and 19.

Turning now to FIGS. 18–20, there is shown an exemplary solenoid anti-back drive device consistent with the invention. In the illustrated embodiment, multiple motors 1800, 1802 are attached for driving an intermediate gear consisting of a face gear 1804 and a pinion 1806 combination. Between the motors and the face gear is a system of high efficiency spur gears that are back drivable.

A solenoid 1808 shares the same power supply as the motors. In an un-energized state, the solenoid plunger 1810 is extended, locking into the side of the intermediate gear 1804, as shown for example in FIG. 19. When the motors are energized, the solenoid is also energized, and the solenoid plunger retracts to unlock the system, as shown in FIG. 18, for example. The pinion 1806 may be configured to meshingly engage a spur output gear 1812 to which an output shaft 1814 is attached. As illustrated more particularly in FIGS. 19 and 20, the solenoid may be provided with a load spring 1900, and the intermediate gear 1804 may be provided with a plurality of equally spaced pockets 1902 for receiving the solenoid plunger in an anti-back drive position. Advantageously, due to the gear ratio between the intermediate gear, the output gear and the window regulator itself, the rotation between pockets 1902 results in very little motion of the window if the solenoid plunger needs to find a home in a pocket 1902.

Figure 21:
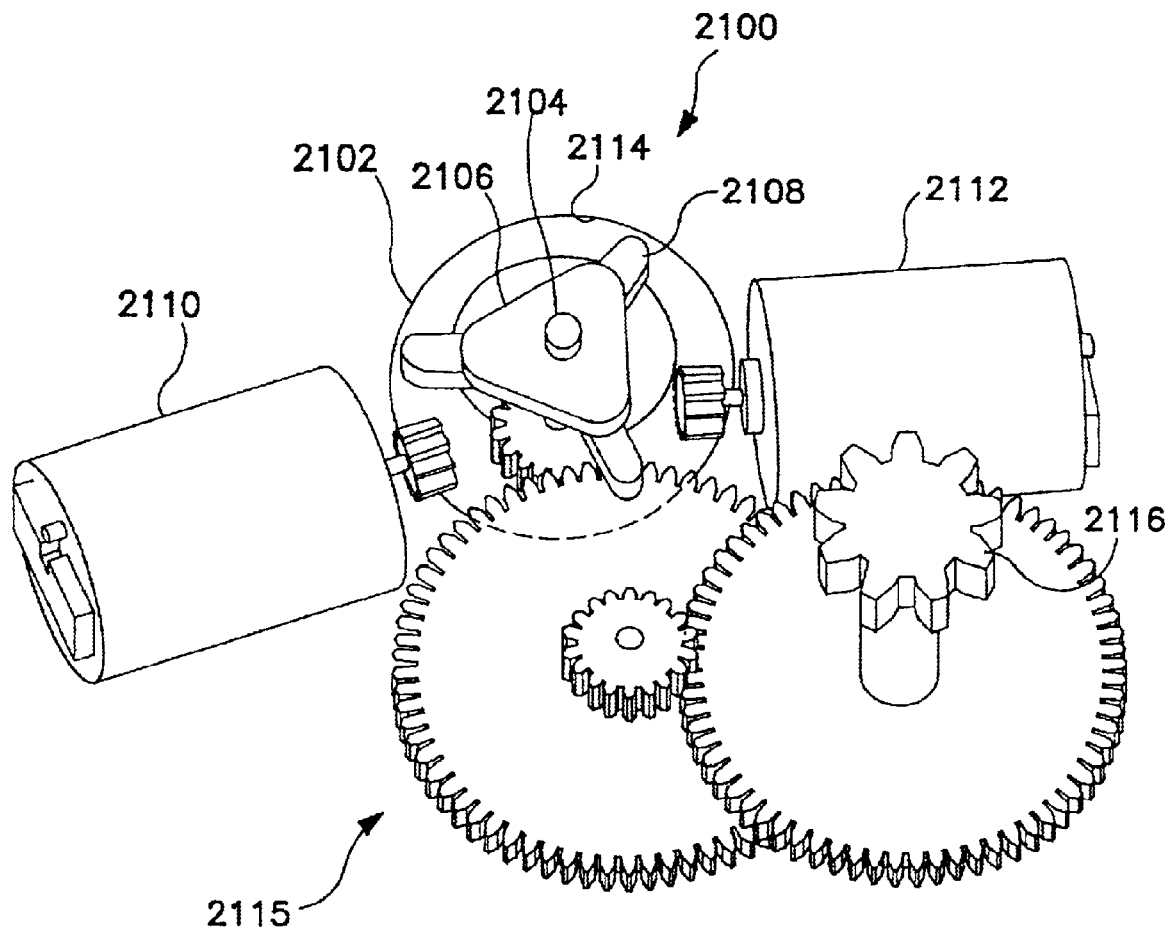
FIG. 21 illustrates another exemplary anti-back drive mechanism consistent with the invention.
Figure 22:
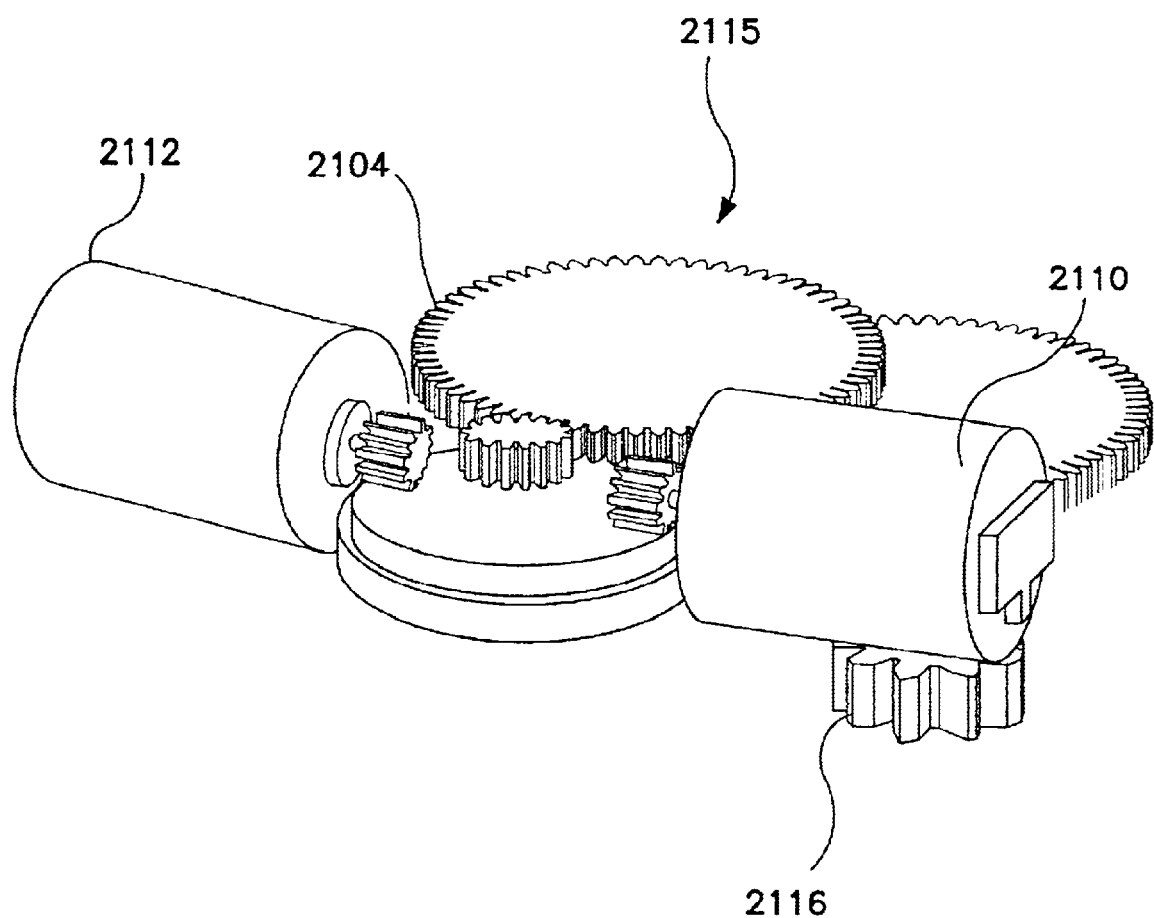
FIG. 22 illustrates a bottom view of the mechanism illustrated in FIG. 21.
Figure 23:
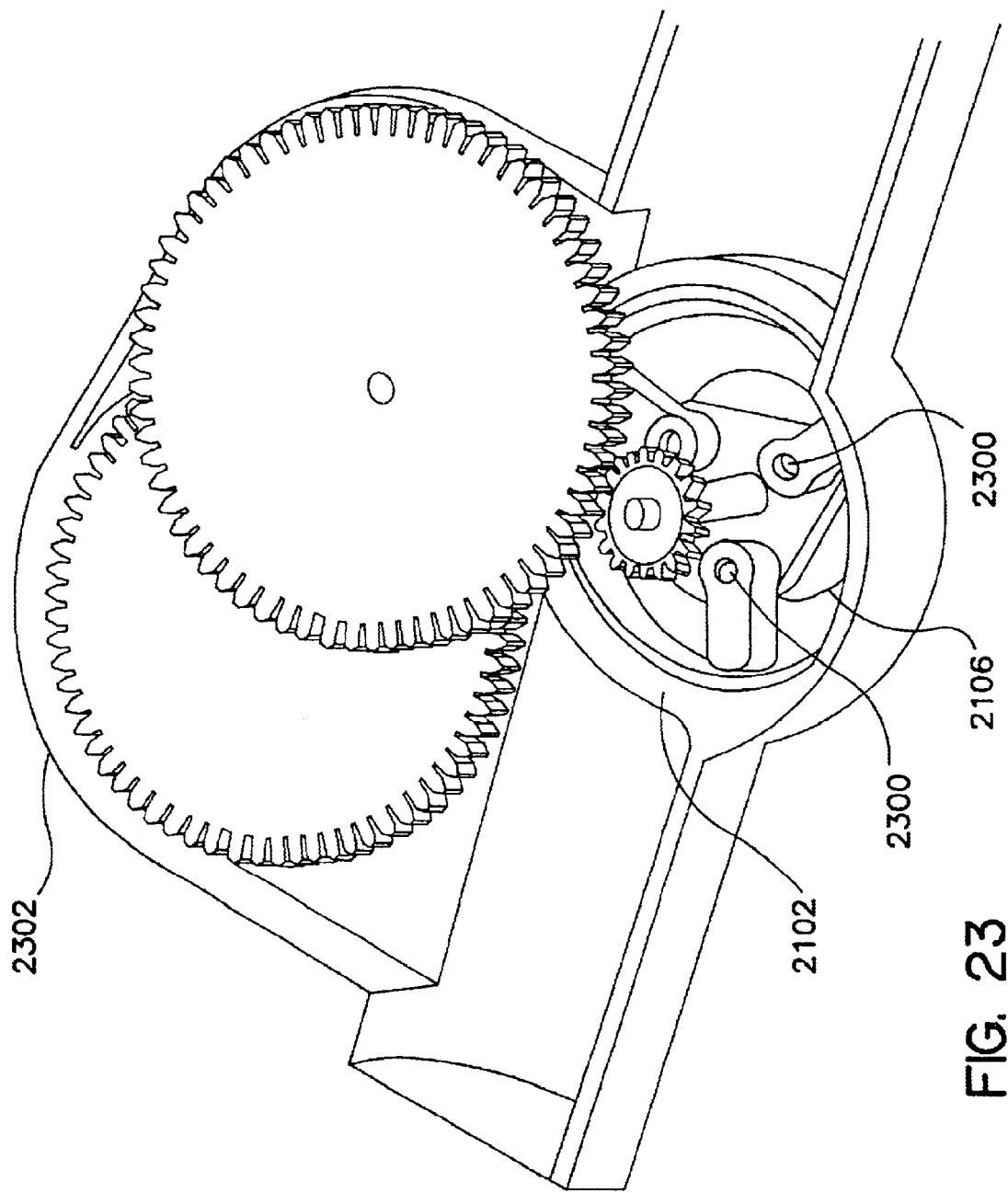
FIG. 23 illustrates an exemplary mounting arrangement for an anti-back drive mechanism as shown in FIGS. 21 and 22.

Another exemplary anti-back drive clutch mechanism is illustrated in FIGS. 21 through 23. As shown in FIG. 21, for example, the mechanism 2100, may include a face gear 2102 with a central shaft 2104. A mounting plate 2106 may be provided at the end of the shaft 2104 to provide a mounting position for a plurality of cams 2108. The cams are pivotally attached to the plate 2106 by pins 2300, as shown for example in FIG. 23.

A plurality of motors, for example, motors 2110 and 2112 may be provided for driving the face gear 2102. With rotation of the face gear by the motors, the cams 2108 rotate about the pins 2300 and ride along the interior surface 2114 of the face gear. However, when a back drive is applied to the system, the back drive force rotates the shaft 2104 through, for example, an associated gear train 2115 to which the output shaft 2116 is coupled. Rotation of the plate causes the cams to pivot about the pins for pressingly engaging the interior surface 2114 of the face gear. With the pins rotated in this manner, engagement of the pins against the interior surface of the face gear prevents further rotation of the shaft 2104, thereby preventing back drive in the system.

FIG. 22 illustrates a bottom view of the system illustrated in FIG. 21, and more particularly shows an exemplary gear train for driving the output shaft 2116. In particular, the shaft 2104 may have a pinion affixed to an opposite end thereof for driving the spur gear set 2114. FIG. 23 illustrates an alternative mounting arrangement for the clutch illustrated in FIG. 21 wherein the housing 2302 is provided for enclosing the motors.

Figure 24:
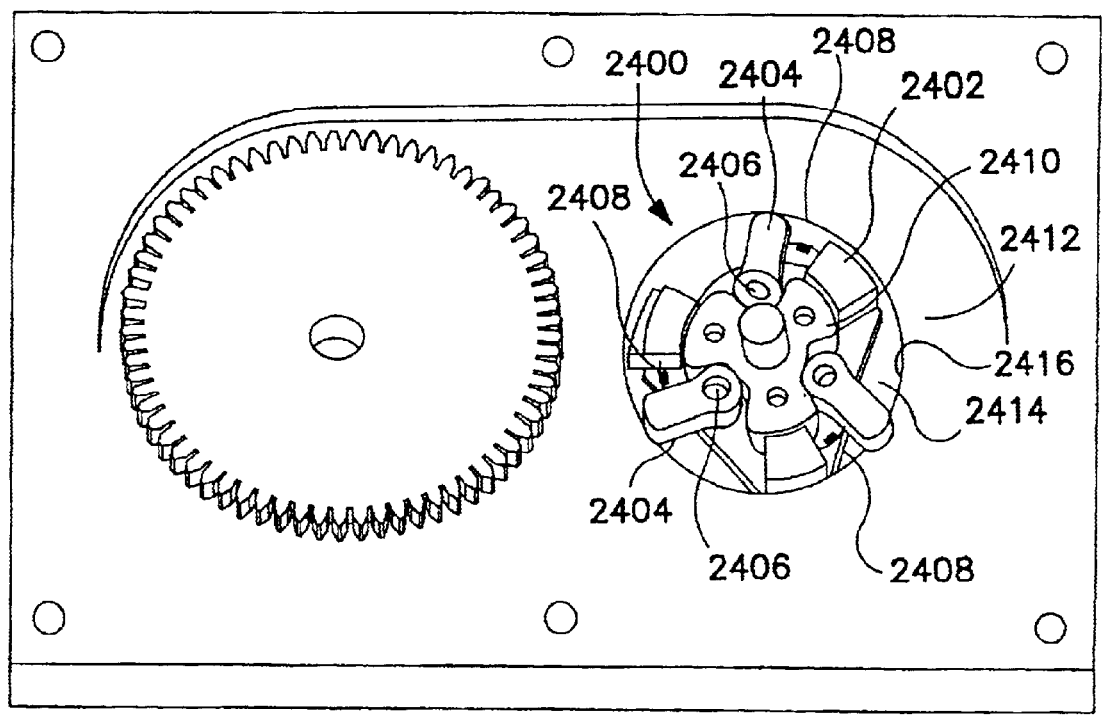
FIG. 24 illustrates another exemplary clutch mechanism consistent with the invention.
Figure 25:
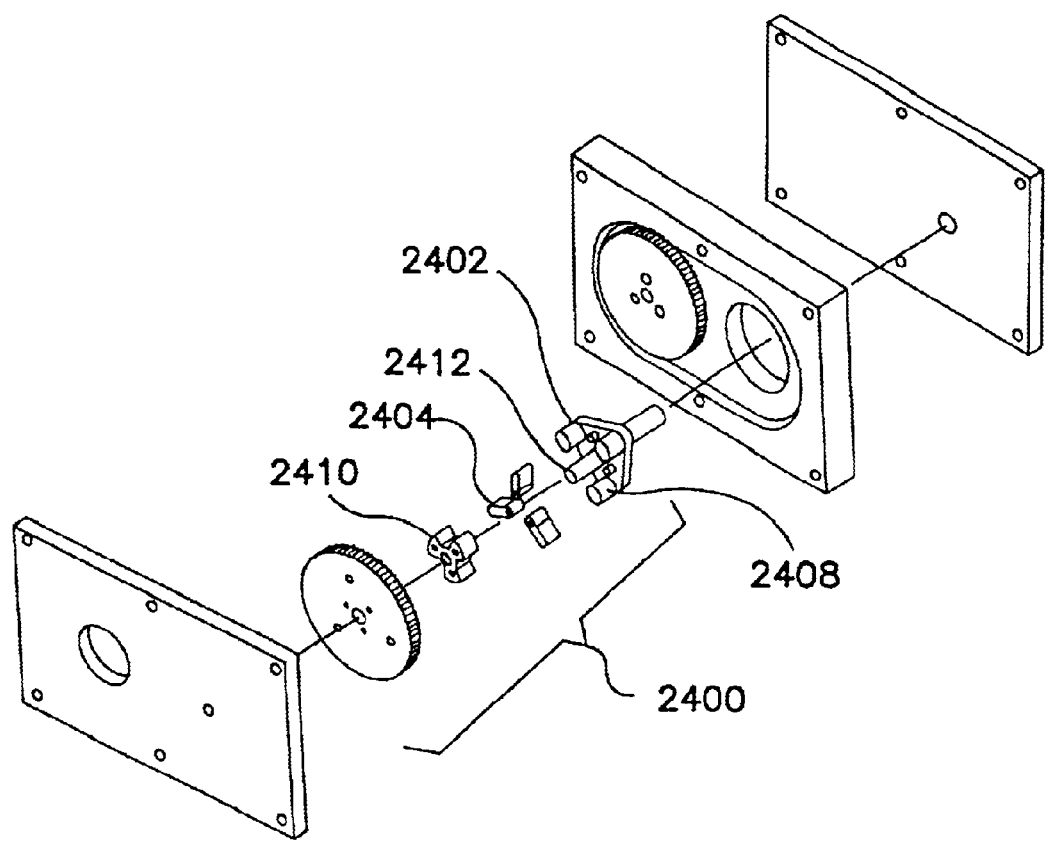
FIG. 25 is an exploded view of the exemplary clutch mechanism illustrated in FIG. 24.

FIGS. 24 and 25 illustrate yet another alternative anti-back drive clutch mechanism 2400. In the illustrated embodiment, the mechanism 2400 includes a carrier 2402, which is preferably driven by an actuator assembly consistent with the invention. A plurality of cams 2404 are pivotally attached to the carrier by pins 2406. Bias springs 2408 are disposed between tabs on the carrier and the cams. A hub 2410 is disposed over a center axis 2412 of the carrier to define a range of motion for the cams 2404.

Rotation of the carrier by an actuator causes the cams 2404 to pivot about the pins 2406 and to ride along the interior surface 2416 of a mounting opening 2414 for the mechanism. When a back drive force is applied to the shaft 2412, however, the cams rotate about the pins 2406 to pressingly engage the interior surface 2416 and thereby resist rotation of the shaft 2412 to provide an anti-back drive.

Figure 26:
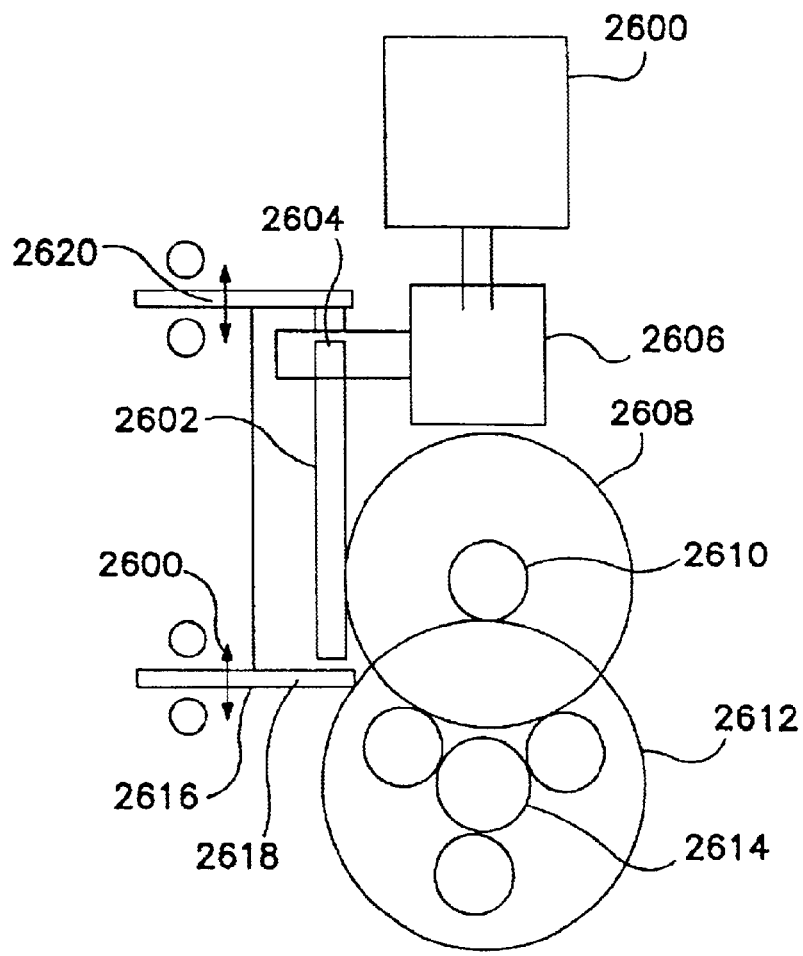
FIG. 26 diagrammatically illustrates an exemplary impact mechanism useful in connection with an actuator consistent with the invention.
Figure 27:
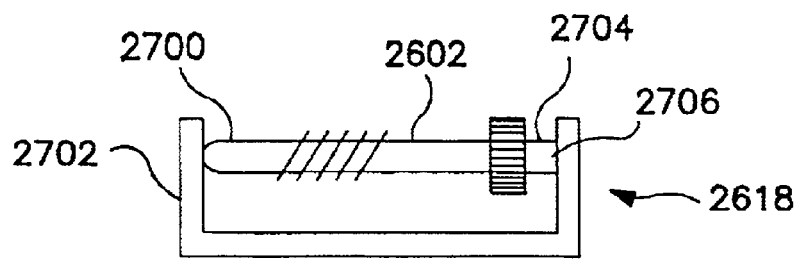
FIG. 27 is a partial side view of the impact mechanism illustrated in FIG. 26.

FIGS. 26 and 27 illustrate an exemplary impact mechanism consistent with the invention. As shown a motor 2600, for example, one of the motors in a multiple motor configuration consistent with the invention drives a worm gear 2602 mounted on a worm wheel 2604 (i.e. a spur gear) through a pinion 2606. The worm gear meshingly engages a spur gear 2608, which includes a pinion 2610 for driving an output gear 2612 to which an output shaft 2614 is attached.

Those skilled in the art will recognize that a variety of gear trains may be incorporated into the illustrated design. Advantageously, however, the worm gear and worm wheel are mounted on the impact mechanism 2616, which includes a carrier 2618 having first 2702 and second 2706 flexible arms. As shown in FIG. 27, a first end 2700 of the worm gear and worm wheel assembly is rotatably mounted on the first arm 2702 of the carrier assembly 2618 and second end 2704 of the worm gear and worm wheel assembly is mounted on the second arm 2706 of the carrier assembly. The arms of the carrier assembly are configured to flex up and down as indicated by arrows 2620 with a known spring rate. If an impact is applied to the output shaft 2614, for example, if an automobile window driven by the mechanism is unexpectedly impeded or arrested during closing, then the impact imparted to the output gear shaft is transmitted through gears 2612, 2608 to the worm gear 2602 and is absorbed by flexure of the carrier 2616. Advantageously, therefore, the impact is not transmitted to the motor causing damage thereto.

There is thus provided, according to one aspect of the invention, an actuator that employs two or more motors connected to a geared drive train(s) to produce variable speed and torque rotary output. Employing multiple smaller motors to provide an equivalent amount of power via a gear train or gear trains provides significant advantages over using a larger single motor. An actuator design using multiple small motors can be thinner and permit assembly in a wider variety of orientations and package shapes. Multiple motors do not need to share same gear train or may be located on parallel gear trains to provide novel power distribution arrangements. Multiple motors can also be of different sizes, varieties, or have different load characteristics connected through a common output shaft. Additionally, each separate motor can be controlled on a different circuit to provide novel and unique torque vs. speed output.

Multiple motors can be selected to have an extended brush/rotor life compared to a single equivalently powered large motor. The multiple motors can be set in a novel way so that the inherent torque ripple of the motors are out of phase with one another. The overall output torque is smoother. This can reduce or cancel actuator vibration and hum inherent in a single motor. Multiple motors on a common drive train provide a soft failure mode in the event that one motor fails. The remaining motors will provide basic function at a reduced performance level until service can be performed. This degraded operation mode can be diagnosed remotely, allowing the computer to alert the driver of a service/maintenance problem and even cause a change in the control scheme. This enhances reliability of the actuator compared to a single motor design where failure of the motor is critical.

A multi-motor actuator has unique benefits that can be advantageous in a window lift application. When combined with simple electronic control circuitry numerous torque and speed outputs can be achieved without introducing advanced velocity control electronics such as Pulse Width Modulation or proportional voltage adjustment. For example, the actuator can operate on motor "A" only, "B" only, "AB", "A with B reversed" etc. There is an inherent resolution of output rotational speed proportional with the number of motors and gear train sets. Meaningful variations can be achieved by combining multiple motors on either parallel drive trains or connecting the motors in series, along with any combination of clutch devices.

An impact mechanism for absorbing rotational impact on an actuator output shaft and preventing damage associated therewith is also provided. According to another aspect of the invention there are provided anti-back drive features that prevent undesired motion in a driven system. For example, in a window lift application, actuator prevents the window from being lowered either inadvertently or by external means. It is frequently important in window regulator systems to prevent movement of the output shaft in the power off condition to hold the window in any fixed position indefinitely. This is important for at least two reasons: 1) to resist drifting due to vibration of the windows mass and 2) to resist forced entry into the vehicle by sliding or otherwise moving the window.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An actuator for a window lift mechanism, said actuator comprising:

an output shaft for driving said mechanism;

an output gear coupled to said output shaft;

a plurality of motors coupled to said output gear for simultaneously driving said output gear and said output shaft, wherein said plurality of motors comprises a first motor having a first torque ripple characteristic and a second motor having a second torque ripple characteristic, wherein said first torque ripple characteristic is at least partially out of phase with said second torque ripple characteristic to reduce vibration imparted to said actuator by said plurality of motors.

2. An actuator according, to claim 1, wherein each of said motors is coupled to said output gear by an associated gear train.

3. An actuator according to claim 2, wherein a first one of said gear trains comprises a worm gear in meshing engagement with said output gear, said worm gear resisting back-drive of said output shaft.

4. An actuator according to claim 1, wherein said output gear comprises a sun gear of a planetary gear system, and wherein said motors are coupled to said sun gear through a ring gear and planet gears of said planetary gear system.

5. An actuator according to claim 4, wherein each of said motors is coupled to said gear by an associated gear train.

6. An actuator according to claim 5, wherein a first one of said gear trains comprises a worm gear in meshing engagement with said sun gear, said worm gear resisting back-drive of said output shaft.

\* \* \* \* \*

UNITED STATES PATENT AND TRADEMARK OFFICE
CERTIFICATE OF CORRECTION

PATENT NO. : 6,889,578 B2 Page 1 of 1
APPLICATION NO. : 09/765899
DATED : May 10, 2005
INVENTOR(S) : Spaziani, et al.

It is certified that error appears in the above-identified patent and that said Letters Patent is hereby corrected as shown below:

On the Title Page:
Please correct Inventor name "Phillip Spaziani, Boston, MA (US)" to: --Philip Spaziani, Boston, MA (US)--

Signed and Sealed this

Fourth Day of July, 2006

JON W. DUDAS
*Director of the United States Patent and Trademark Office*